(12) United States Patent
Ivakitch

(10) Patent No.: US 11,306,609 B2
(45) Date of Patent: Apr. 19, 2022

(54) RETRACTABLE WASHING DEVICE

(71) Applicant: PRATT & WHITNEY CANADA CORP., Longueuil (CA)

(72) Inventor: Richard Ivakitch, Scarborough (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 187 days.

(21) Appl. No.: 16/577,540

(22) Filed: Sep. 20, 2019

(65) Prior Publication Data

US 2021/0087974 A1  Mar. 25, 2021

(51) Int. Cl.
*F01D 25/00* (2006.01)
*F02C 7/30* (2006.01)
*B08B 3/08* (2006.01)

(52) U.S. Cl.
CPC .............. *F01D 25/002* (2013.01); *B08B 3/08* (2013.01); *F02C 7/30* (2013.01); *F05D 2220/32* (2013.01); *F05D 2260/95* (2013.01)

(58) Field of Classification Search
CPC ................................. F01D 25/002; F02C 7/30
See application file for complete search history.

(56) References Cited

U.S. PATENT DOCUMENTS

| | | | | |
|---|---|---|---|---|
| 2,909,325 | A * | 10/1959 | Hunter | B05B 3/008 239/97 |
| 3,033,711 | A * | 5/1962 | Harding | B24C 3/32 134/7 |
| 3,184,115 | A * | 5/1965 | Meshberg | A61M 15/0023 222/156 |
| 4,046,155 | A * | 9/1977 | Mansson | B08B 3/02 134/167 R |
| 5,193,976 | A * | 3/1993 | Kolev | F04D 29/705 415/116 |
| 6,073,637 | A * | 6/2000 | Hayward | B08B 3/02 134/198 |
| 6,128,792 | A * | 10/2000 | Mathews | E04H 4/169 4/490 |
| 2008/0163902 | A1 * | 7/2008 | Mueller | F02C 6/12 134/115 R |
| 2017/0198635 | A1 * | 7/2017 | Subbarao | F01D 25/002 |
| 2017/0268377 | A1 * | 9/2017 | Flynn | B08B 9/00 |
| 2018/0036776 | A1 * | 2/2018 | Files | B08B 9/04 |
| 2019/0111458 | A1 * | 4/2019 | Mantravadi | F01D 25/002 |
| 2020/0025649 | A1 * | 1/2020 | Stowe | B08B 9/00 |

FOREIGN PATENT DOCUMENTS

GB   343797 A  *  2/1931  ............. B05B 15/74

* cited by examiner

*Primary Examiner* — Michael Lebentritt
*Assistant Examiner* — Brian Christopher Delrue
(74) *Attorney, Agent, or Firm* — Norton Rose Fulbright Canada

(57) ABSTRACT

A gas turbine engine having an engine core defining a core flow path delimited by an engine casing, a washing device having a spraying member defining a conduit in fluid communication with a source of washing fluid, the spraying member having a spraying section for outputting the washing fluid from the conduit, the spraying member movable relative to the engine casing from a retracted position in which the spraying section is flush with a surface of the engine casing defining said core flow path, and an expanded position in which the spraying section protrudes beyond the surface of the engine casing into the core flow path 19 Claims, 1 Drawing Sheet

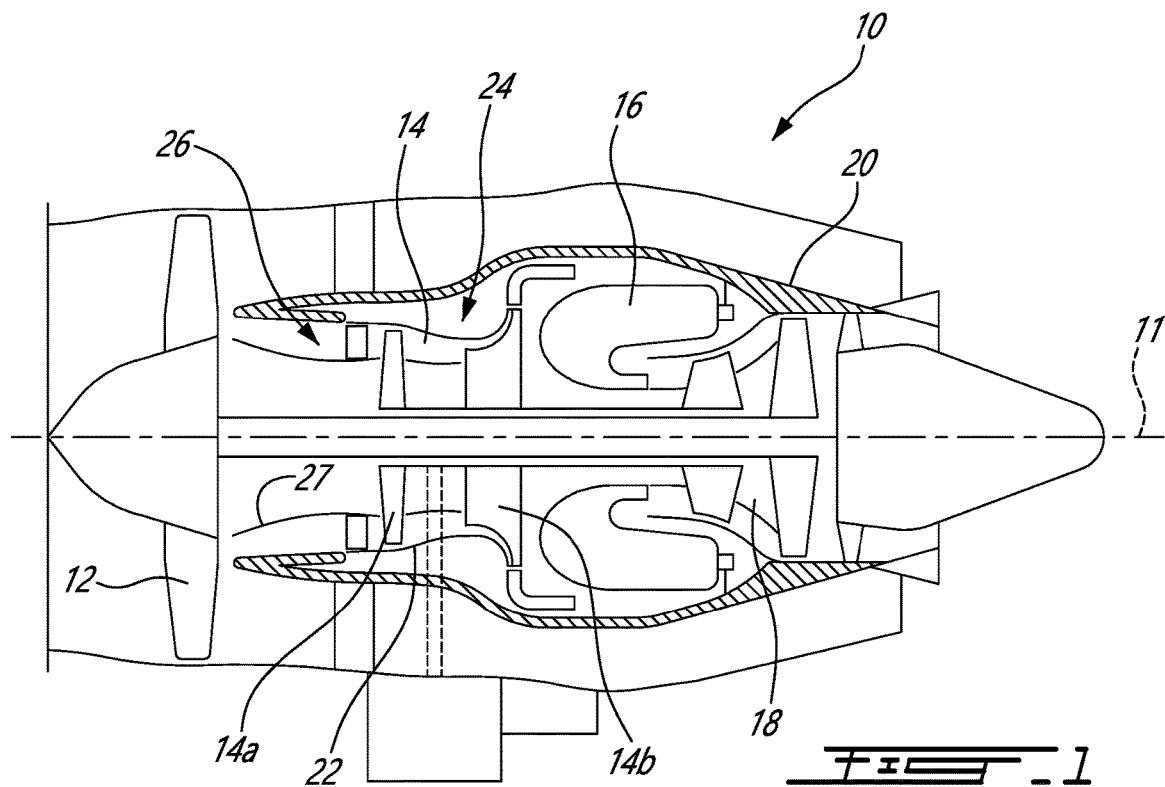
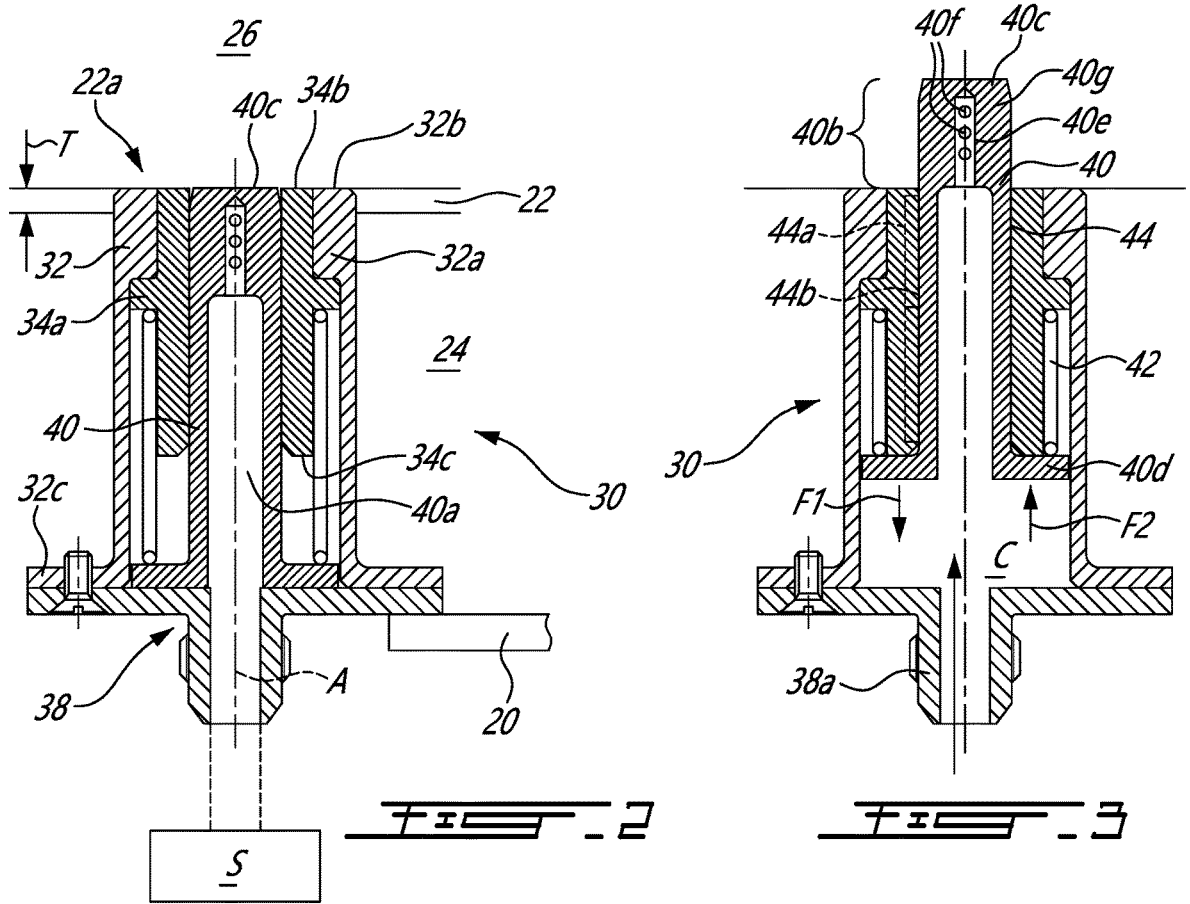

RETRACTABLE WASHING DEVICE

TECHNICAL FIELD

The application relates generally to gas turbine engines and, more particularly, to wash features to be used in such engines.

BACKGROUND OF THE ART

It might be required to wash compressors used in gas turbine engines at certain intervals since air pollution products may deposit dirt on blades. Usually the washing of the compressors is performed by spraying water into the air inlet of the compressor during engine start-up. Such a process is cumbersome. Improvements are desired.

SUMMARY

In one aspect, there is provided a gas turbine engine comprising an engine core defining a core flow path delimited by an engine casing, a washing device having a spraying member defining a conduit in fluid communication with a source of washing fluid, the spraying member having a spraying section for outputting the washing fluid from the conduit, the spraying member movable relative to the engine casing from a retracted position in which the spraying section is flush with a surface of the engine casing defining said core flow path, and an expanded position in which the spraying section protrudes beyond the surface of the engine casing into the core flow path.

In another aspect, there is provided a washing device for a gas turbine engine, comprising: a housing securable to a casing of the gas turbine engine and defining a cavity fluidly connectable to a source of washing fluid; a spraying member slidably received within the cavity of the housing and defining a conduit in fluid communication with the cavity for receiving the washing fluid, the spraying member having a spraying section for outputting the washing fluid from the conduit, the spraying member movable from a retracted position in which the spraying section is entirely contained within the cavity and an expanded position in which the spraying section protrudes outside the cavity; and a biasing member in engagement with both of the housing and the spraying member, the biasing member exerting a biasing force on the spraying member such that the spraying member is biased in the retracted position when the washing device is not in operation, the biasing force less than a fluid force exerted on the spraying member by a pressure of the washing fluid when the washing device is in operation.

In yet another aspect, there is provided a method of operating a washing device of a gas turbine engine, comprising: receiving a washing fluid in the washing device; with a pressure of the received washing fluid, moving a spraying member from a retracted position in which the spraying member is flush with a surface of a casing of the gas turbine engine defining a flow path thereof to an expanded position in which the spraying member protrudes in the flow path; and spraying the washing fluid in the flow path toward blades of a component of the gas turbine engine via a spraying section of the spraying member.

DESCRIPTION OF THE DRAWINGS

Reference is now made to the accompanying figures in which:

FIG. 1 is a schematic cross sectional view of a gas turbine engine;

FIG. 2 is a schematic cross-sectional view of a washing device shown in a retracted position to be used with the gas turbine engine of FIG. 1; and FIG. 3 shows the washing device of FIG. 2 in an expanded position.

DETAILED DESCRIPTION

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 may include a low-pressure section 14a and a high-pressure section 14b. The fan 12, the compressor section 14, and the turbine section 18 are rotatable about a central axis 11 of the engine 10. The compressor section 14, the combustor 16, and the turbine section 18 form a core of the engine 10.

The gas turbine engine 10 has an outer engine casing 20 (a.k.a., outer case) and an inner engine casing 22 (a.k.a., inner case) located radially inward of the outer engine casing 20 relative to the central axis 11. A plenum 24 is located radially between the outer and inner casings 20, 22. A core flow path 26, annular in shape, is defined by the engine casing 22 and is located radially inwardly therefrom relative to the central axis 11. The core flow path 26 is delimited at its radially-inner end by a core casing 27 located radially inwardly of the inner casing 22. The core flow path 26 is defined between the core casing 27 and the inner casing 22.

In some cases, it might be required to clean certain components of the gas turbine engine. For instance, dirt may deposit over blades and/or vanes of the turbine section 18 and/or of the compressor section 16. In some cases, efficiency of the gas turbine engine 10 is decreased because of this coating of dirt.

Referring now to FIGS. 1-3, a washing device may be installed in the gas turbine engine 10 for removing the dirt. The washing device is shown generally at 30 and may be installed upstream of the high-pressure compressor 14a and downstream of the low-pressure compressor 14b of the compressor section 14. The washing device 30 may be located at least partially within the plenum 24, to be concealed therein.

The washing device 30 may include a housing 32 secured to the inner casing 22 and/or to the outer casing 20, or integrally formed with one or both of the inner casing 22 and/or to the outer casing 20. The housing 32 may define a cavity C fluidly connectable to a source of washing fluid S. The washing fluid may be a liquid, such as water or water with a washing agent, among other possibilities. In the embodiment shown, a sleeve 34 is mounted within the housing 32. The sleeve 34 may be pressed fit into the housing 32, or connected to it in any other appropriate way (e.g., integrally connected, threaded, monoblock forming, etc). The housing 32 may define a shoulder 32a and the sleeve 34 may have an annular tab or flange 34a being in abutment with the shoulder 32a, to delimit the position of the sleeve 34 in the housing 32. In the embodiment shown, an end 32b of the housing 32 is axially aligned with an end 34b of the sleeve 34 relative to an axis A of the device 30. Both of the ends 32b, 34b of the housing 32 and of the sleeve 34 may be flush with the inner casing 22. In other words, both of the ends 32b, 34b of the housing 32 and of the sleeve 34 may be axially aligned with the inner casing 22 relative to the axis A. Herein, flush or axially aligned with the inner casing 22 implies flush or axially aligned with a surface of the inner casing 22 that is exposed to the core flow path 26. In other words, a generally continuous surface may be formed in the path 26 at the location of the washing device 30, without the projection of the housing 32 and sleeve 34 (if present) beyond the surrounding surface of the inner casing 22.

In the embodiment shown, the sleeve 34 includes another end 34c opposed to the end 34b. The other end 34c may define an abutment surface or like stop whose function is described herein below.

In the embodiment shown, the housing 32 includes a connecting member 32c, provided herein the form of an annular flange, secured to a connector 38 via fasteners. The connector 38 defines a fitting 38a, which is herein a quick-connect fitting, for connection with a hose, pipe or like fluid conduit, fluidly connected to the source of washing fluid S. The device 30 may be secured to the outer casing 20 via the connector 38 or via the annular flange. Any suitable way of securing the device 30 to any or both of the inner and outer casings 20, 22 may be used without departing from the scope of the present disclosure.

The washing device 30 further may have a spraying member 40 slidably received within the cavity C of the housing 32 and being in a sliding engagement within the housing 32 and/or sleeve 34, such that it may move along axis A, at least in translation. The spraying member 40 defines a conduit 40a therein in fluid communication with the cavity C for receiving the washing fluid. The spraying member 40 has a spraying section 40b (i.e., spraying head, nozzle, jet, sprinkler head) for outputting the washing fluid. The output of washing fluid may be in the form of a jet or jets.

Referring more particularly to FIGS. 2-3, the spraying member 40 is movable from a retracted position, shown in FIG. 2, to an expanded position, shown in FIG. 3. In the retracted position, the spraying section 40b is flush with the inner casing 22. In other words, a generally continuous surface may be formed in the path 26 at the location of the washing device 30, without the projection of spraying section 40b, the housing 32 and sleeve 34 (if present) beyond the surrounding surface of the inner casing 22. The surface of the path 26 commonly formed by the inner casing 22, the housing 32 and sleeve 34 (if present), and the spraying section 40b is continuous (i.e., without steps), in the retracted position. In the expanded position, the spraying section 40b protrudes outside the cavity C and in the core flow path 26. In the embodiment shown, an end 40c of the spraying section 40b is axially aligned with both of the ends 32b, 34b of the housing 32 and of the sleeve 34 when the spraying member 40 is in the retracted position.

The spraying member 40, at an end opposite the spraying section 40b, defines an annular flange 40d. The annular flange 40d may be in contact with the abutment surface defined by the other end 34c of the sleeve 34 when the spraying member 40 is in the expanded position. The sleeve 34 and the annular flange 40d of the spraying member 40 may act as a stopper to prevent the spraying section 40b from extending radially too far into the core flow path 26.

In the embodiment shown, the inner casing 22 defines an aperture 22a that is sized correspondingly to a size of the housing 32. In other words, a diameter of the aperture 22a may be sized to snuggly receive the housing 32 to limit air leakage from the core flow path 26. Alternatively, the aperture 22a may be sized to snuggly receive the spraying section 40b (or the sleeve 34) of the spraying member 40; in such a case, the end 40c of the spraying section 40b may be axially distanced from the end 32b of the housing 32 by a value corresponding to a thickness T of the inner casing 22. Other configurations are contemplated.

Still referring to FIGS. 2-3, the washing device 30 may further include biasing member 42, which is a coil spring in the embodiment shown. The biasing member 42 is in engagement with both of the housing 32 and the spraying member 40. In the depicted embodiment, the biasing member 42 is in engagement with the housing 32 via the sleeve 34 and is in engagement with the spraying member 40 via the annular flange 40d thereof. The spring 42 may circumferentially extend around the spraying member 40 and around the sleeve 34 relative to the axis A. Alternatively, the washing device 30 may be located at a bottom section of the engine casing such that the spraying member remains in the retracted position by gravity (i.e. bottom being relative to an orientation of the gas turbine engine 10 for instance when an engine is on a runway).

The biasing member 42 may alternatively be any suitable mean adapted to exert a force between the spraying member and the housing. For instance, the biasing member may be elastomeric material, a gas contained within an annular space radially between the housing and the spraying member, gravity and so on.

In the embodiment shown, the biasing member 42 exerts a biasing force F1 on the spraying member 40; the force F1 biasing the spraying member 40 in the retracted position when the washing device 30 is not in operation. In other words, when washing fluid stop being injected in the cavity C, the spraying member 40 retracts by itself via the biasing member 42 to the retracted position so that the spraying section 40b of the spraying member 40 might not aerodynamically interfere with air circulating in the core flow path 26.

When the washing fluid is injected in the cavity C, it creates a pressure force F2 that pushes the spraying member 40 from the retracted position to the expanded position. The force F2 is greater than the force F1 such that the biasing member 42 allows the spraying member 40 to extend to the expanded position when washing fluid is injected in the cavity C.

In the embodiment shown, the conduit 40 has a narrowed section 40e located within the spraying section 40b. Having a cross-sectional area of the conduit 40 being smaller in the narrowed section 40e than in a remainder of the conduit 40 might allow to increase the pressure force F2 generated by the washing fluid injected in the cavity C by constricting the flow of washing fluid before it is outputted in the core flow path 26, thus creating a jet or spray, for example.

In the depicted embodiment, the spraying section 40b of the spraying member 40 defines at least one aperture 40f, three apertures 40f in the embodiment shown, that are each fluidly connected to the conduit 40a for receiving and expelling the washing fluid from the conduit 40a and to the core flow path 26 for washing. In the present embodiment, the at least one aperture 40f is oriented in a downstream direction relative to a flow of air within the core flow path 26. The at least one aperture 40f is oriented in a direction being at least partially radial relative to the axis A. The at least one aperture 40f is defined through a peripheral wall 40g of the spraying member 40; the peripheral wall 40g extending circumferentially around the axis A.

An anti-rotation feature 44 may be provided between the housing 32 and the spraying member 40, herein between the sleeve 34 and the spraying member 40. The anti-rotation feature 44 is used for maintaining a relative circumferential position of the spraying member 40 relative to the housing 32 at least when the spraying member 40 is in the expanded position. This might be useful to ensure that the at least one aperture 40f is always oriented toward the component to be washed (e.g., blades of the high-pressure compressor 14b). In the present embodiment, the anti-rotation feature 44 includes at least one tab 44a defined by one of the housing 32 (herein the sleeve 34) and the spraying member 40 and at least one slot 44b defined by the other of the housing and the spraying member; the at least one slot 44b slidably receiving the at least one tab 44a. Any other suitable anti-rotation feature, such as, a keyway, tongue and groove, and so on may be used without departing from the scope of the present disclosure.

The washing device 30 may be removable and actuated by the supply pressure and automatically retracts out of the gaspath when disconnected. The piston may ride on a sleeve which may be pressed into a housing. Water pressure pushes the piston up and into the gas turbine engine gaspath and sprays compressor wash fluid onto the airfoils. All parts of the washing device 30 may be made of corrosion resistant metals and composites/plastics. The wash port can be installed similarly to a standard transfer tube if required and can be removed for service or replacement. A cap on the aperture defined through the casing 22 can be installed when not in use to limit gaspath leakage. This washing device may either be an engine component or part of a tool which could be plugged in as required. A quick connect fitting could be used to save hook up and removal time.

For operating the washing device, a washing fluid is received in the washing device; with a pressure of the received washing fluid, the spraying member is moved from the retracted position in which the spraying member is flush with the inner surface of the casing of the gas turbine engine that defines the flow path thereof to the expanded position in which the spraying member protrudes in the flow path; and the washing fluid is sprayed in the flow path toward the blades of the component of the gas turbine engine via the spraying section of the spraying member.

Embodiments disclosed herein include:

A. A gas turbine engine comprising an engine core defining a core flow path delimited by an engine casing, a washing device having a spraying member defining a conduit in fluid communication with a source of washing fluid, the spraying member having a spraying section for outputting the washing fluid from the conduit, the spraying member movable relative to the engine casing from a retracted position in which the spraying section is flush with a surface of the engine casing defining said core flow path, and an expanded position in which the spraying section protrudes beyond the surface of the engine casing into the core flow path.

B. A washing device for a gas turbine engine, comprising: a housing securable to a casing of the gas turbine engine and defining a cavity fluidly connectable to a source of washing fluid: a spraying member slidably received within the cavity of the housing and defining a conduit in fluid communication with the cavity for receiving the washing fluid, the spraying member having a spraying section for outputting the washing fluid from the conduit, the spraying member movable from a retracted position in which the spraying section is entirely contained within the cavity and an expanded position in which the spraying section protrudes outside the cavity; and a biasing member in engagement with both of the housing and the spraying member, the biasing member exerting a biasing force on the spraying member such that the spraying member is biased in the retracted position when the washing device is not in operation, the biasing force less than a fluid force exerted on the spraying member by a pressure of the washing fluid when the washing device is in operation.

Embodiments A and B may include any of the following elements in any combinations:

Element 1: the spraying member is slidably received within a housing, the housing secured to the engine casing and defining a cavity fluid connected to the source of washing fluid and to the conduit of the spraying member. Element 2: a biasing member is in engagement with the spraying member and the housing and exerts a biasing force on the spraying member such that the spraying member is biased in the retracted position when the washing device is not in operation, the biasing force less than a fluid force exerted on the spraying member by a pressure of the washing fluid when the washing device is in operation. Element 3: the engine casing defines an aperture for receiving the spraying member, a size of the aperture corresponding to that of the spraying member. Element 4: the engine casing defines an aperture, a size of the aperture corresponding to that of the housing, the housing being flush with the engine casing, the spraying section contained within the cavity when the spraying member is in the retracted position. Element 5: the spraying section defines at least one spraying aperture for outputting the washing fluid, the at least one spraying aperture oriented in a downstream direction relative to air circulating in the core flow path. Element 6: an anti-rotation feature between the housing and the spraying member for maintaining a relative circumferential position of the spraying member relative to the housing at least when the spraying member is in the expanded position. Element 7: the anti-rotation feature includes at least one tab defined by one of the housing and the spraying member and at least one slot defined by the other of the housing and the spraying member, the at least one slot slidably receiving the at least one tab. Element 8: a compressor section having a low-pressure compressor and a high-pressure compressor, the washing device located between the low-pressure compressor and a high-pressure compressor. Element 9: the washing device is removably securable to the engine casing. Element 10: the washing device includes a quick connect fitting secured to the housing for selectively connecting the washing device to the source of washing fluid. Element 11: a sleeve located within the housing and surrounding the spraying member, the spraying member in a sliding engagement with the sleeve. Element 12: an end of the spraying section is axially aligned with an end of the housing in the retracted position. Element 13: the biasing member is a spring disposed within the cavity and around the spraying member. Element 14: the spraying section defines at least one spraying aperture for outputting the washing fluid in a direction being at least partially radial relative to an axis of the washing device. Element 15: an anti-rotation feature between the housing and the spraying member for maintaining a relative circumferential position of the spraying member relative to the housing at least when the spraying member is in the expanded position.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A gas turbine engine comprising an engine core defining a core flow path delimited by an engine casing extending annularly around a central axis, a washing device having a spraying member defining a conduit in fluid communication with a source of washing fluid, the spraying member having a spraying section for outputting the washing fluid from the conduit, the spraying member movable relative to the engine casing along a direction having a radial component relative to the central axis from a retracted position in which the spraying section is flush with a surface of the engine casing defining said core flow path, and an expanded position in which the spraying section protrudes beyond the surface of the engine casing into the core flow path.

2. The gas turbine engine of claim 1, wherein the spraying member is slidably received within a housing, the housing secured to the engine casing and defining a cavity fluidly connected to the source of washing fluid and to the conduit of the spraying member.

3. The gas turbine engine of claim 2, wherein a biasing member is in engagement with the spraying member and the housing and exerts a biasing force on the spraying member such that the spraying member is biased in the retracted position when the washing device is not in operation, the biasing force less than a fluid force exerted on the spraying member by a pressure of the washing fluid when the washing device is in operation.

4. The gas turbine engine of claim 1, wherein the engine casing defines an aperture for receiving the spraying member, a size of the aperture corresponding to that of the spraying member.

5. The gas turbine engine of claim 2, wherein the engine casing defines an aperture, a size of the aperture corresponding to that of the housing, the housing being flush with the engine casing, the spraying section contained within the cavity when the spraying member is in the retracted position.

6. The gas turbine engine of claim 1, wherein the spraying section defines at least one spraying aperture for outputting the washing fluid, the at least one spraying aperture oriented in a downstream direction relative to air circulating in the core flow path.

7. The gas turbine engine of claim 2, further comprising an anti-rotation feature between the housing and the spraying member for maintaining a relative circumferential position of the spraying member relative to the housing at least when the spraying member is in the expanded position.

8. The gas turbine engine of claim 7, wherein the anti-rotation feature includes at least one tab defined by one of the housing and the spraying member and at least one slot defined by the other of the housing and the spraying member, the at least one slot slidably receiving the at least one tab.

9. The gas turbine engine of claim 1, including a compressor section having a low-pressure compressor and a high-pressure compressor, the washing device located between the low-pressure compressor and a high-pressure compressor.

10. The gas turbine engine of claim 1, wherein the washing device is removably securable to the engine casing.

11. The gas turbine engine of claim 2, wherein the washing device includes a quick connect fitting secured to the housing for selectively connecting the washing device to the source of washing fluid.

12. The gas turbine engine of claim 2, further comprising a sleeve located within the housing and surrounding the spraying member, the spraying member in a sliding engagement with the sleeve.

13. A washing device for a gas turbine engine, comprising: a housing securable to a casing of the gas turbine engine and defining a cavity fluidly connectable to a source of washing fluid; a spraying member slidably received within the cavity of the housing and defining a conduit in fluid communication with the cavity for receiving the washing fluid, the spraying member having a spraying section for outputting the washing fluid from the conduit, the spraying member movable from a retracted position in which the spraying section is entirely contained within the cavity and an expanded position in which the spraying section protrudes outside the cavity; and a biasing member in engagement with both of the housing and the spraying member, the biasing member exerting a biasing force on the spraying member such that the spraying member is biased in the retracted position when the washing device is not in operation, the biasing force less than a fluid force exerted on the spraying member by a pressure of the washing fluid when the washing device is in operation.

14. The washing device of claim 13, wherein an end of the spraying section is axially aligned with an end of the housing in the retracted position.

15. The washing device of claim 13, wherein the biasing member is a spring disposed within the cavity and around the spraying member.

16. The washing device of claim 13, wherein the spraying section defines at least one spraying aperture for outputting the washing fluid in a direction being at least partially radial relative to an axis of the washing device.

17. The washing device of claim 13, further comprising an anti-rotation feature between the housing and the spraying member for maintaining a relative circumferential position of the spraying member relative to the housing at least when the spraying member is in the expanded position.

18. The washing device of claim 13, wherein the washing device includes a quick connect fitting secured to the housing for selectively connecting the washing device to the source of washing fluid.

19. The washing device of claim 13, further comprising a sleeve located within the housing and surrounding the spraying member, the spraying member in a sliding engagement with the sleeve.

* * * * *